US008161551B1

(12) United States Patent
Muttik et al.

(10) Patent No.: US 8,161,551 B1
(45) Date of Patent: Apr. 17, 2012

(54) SYSTEM, METHOD, AND COMPUTER PROGRAM PRODUCT FOR ENABLING COMMUNICATION BETWEEN SECURITY SYSTEMS

(75) Inventors: Igor Muttik, Berkhamsted (GB); Steve O. Hearnden, Milton Keynes (GB); Joel Robert Spurlock, Newberg, OR (US)

(73) Assignee: McAfee, Inc., Santa Clara, CA (US)

( * ) Notice: Subject to any disclaimer, the term of this patent is extended or adjusted under 35 U.S.C. 154(b) by 541 days.

(21) Appl. No.: 12/427,637

(22) Filed: Apr. 21, 2009

(51) Int. Cl.
*G06F 11/00* (2006.01)
*G06F 7/04* (2006.01)
*G06F 15/18* (2006.01)

(52) U.S. Cl. .......... 726/22; 713/100; 709/220; 709/221; 709/222; 709/228; 709/230

(58) Field of Classification Search .............. 726/22; 713/100; 709/220, 221, 222, 228, 230
See application file for complete search history.

(56) References Cited

U.S. PATENT DOCUMENTS

| 6,546,419 B1 * | 4/2003 | Humpleman et al. ........ 709/223 |
| 7,496,960 B1 * | 2/2009 | Chen et al. ..................... 726/22 |
| 2003/0014470 A1 * | 1/2003 | Iijima ........................... 709/106 |
| 2004/0136533 A1 * | 7/2004 | Takagaki et al. .............. 380/255 |
| 2004/0224674 A1 * | 11/2004 | O'Farrell et al. ............. 455/418 |
| 2006/0031673 A1 * | 2/2006 | Beck et al. ..................... 713/164 |
| 2006/0117378 A1 * | 6/2006 | Tam et al. ......................... 726/3 |
| 2006/0223503 A1 * | 10/2006 | Muhonen et al. .......... 455/414.1 |
| 2007/0297611 A1 * | 12/2007 | Yun et al. ....................... 380/270 |
| 2008/0256635 A1 * | 10/2008 | Gassoway ....................... 726/24 |
| 2011/0185348 A1 * | 7/2011 | Cordesse et al. .............. 717/170 |

OTHER PUBLICATIONS

Prehofer, Christian et al. "Synchronized Reconfiguration of a Group of Mobile Nodes in Ad-Hoc Networks", 2003 IEEE.*

* cited by examiner

*Primary Examiner* — Michael Simitoski
(74) *Attorney, Agent, or Firm* — Patent Capital Group

(57) ABSTRACT

A system, method, and computer program product are provided for enabling communication between security systems. In use, a first communication protocol of a first security system and a second communication protocol of a second security system are identified, where the first communication protocol and the second communication protocol are different such that the first security system and the second security system are incapable of communicating therebetween. Further, the first security system is updated with a first security definition and/or the second security system is updated with a second security definition for enabling communication between the first security system and the second security system.

16 Claims, 5 Drawing Sheets

SYSTEM, METHOD, AND COMPUTER PROGRAM PRODUCT FOR ENABLING COMMUNICATION BETWEEN SECURITY SYSTEMS

FIELD OF THE INVENTION

The present invention relates to security systems, and more particularly to communication capabilities of security systems.

BACKGROUND

Security systems have traditionally been utilized for detecting, removing, etc. unwanted data (e.g. malware, spyware, unsolicited data, etc.). Oftentimes, it is advantageous for separate security systems to communicate, such as for sharing information regarding known, detected, etc. unwanted data. Unfortunately, traditional security systems have exhibited various limitations with respect to communication capabilities thereof.

Just by way of example, traditional security systems are generally periodically updated and upgraded, and the frequency of such updates and upgrades is increasing such that new types of systems are frequently becoming available. While new security systems may sometimes be capable of being programmed to communicate with old security systems via protocols existing in the old security systems, requiring such programming is restrictive since the protocols utilized must be defined at the time when the old security system was developed. In addition, when the old security systems need a way to communicate with newer security systems, communication therebetween is impossible since the old security systems are not already equipped with the communication protocols used by the newer security systems.

A similar problem exists for two security systems developed independently (e.g. as a result of different developers or, simply, due to a lack of internal communication between such developers). Both security systems may be released, but to pass messages from one another both products may be required to be re-released, which may be very costly. There is thus a need for addressing these and/or other issues associated with the prior art.

SUMMARY

A system, method, and computer program product are provided for enabling communication between security systems. In use, a first communication protocol of a first security system and a second communication protocol of a second security system are identified, where the first communication protocol and the second communication protocol are different such that the first security system and the second security system are incapable of communicating therebetween. Further, the first security system is updated with a first security definition and/or the second security system is updated with a second security definition for enabling communication between the first security system and the second security system.

DETAILED DESCRIPTION

Figure 1:
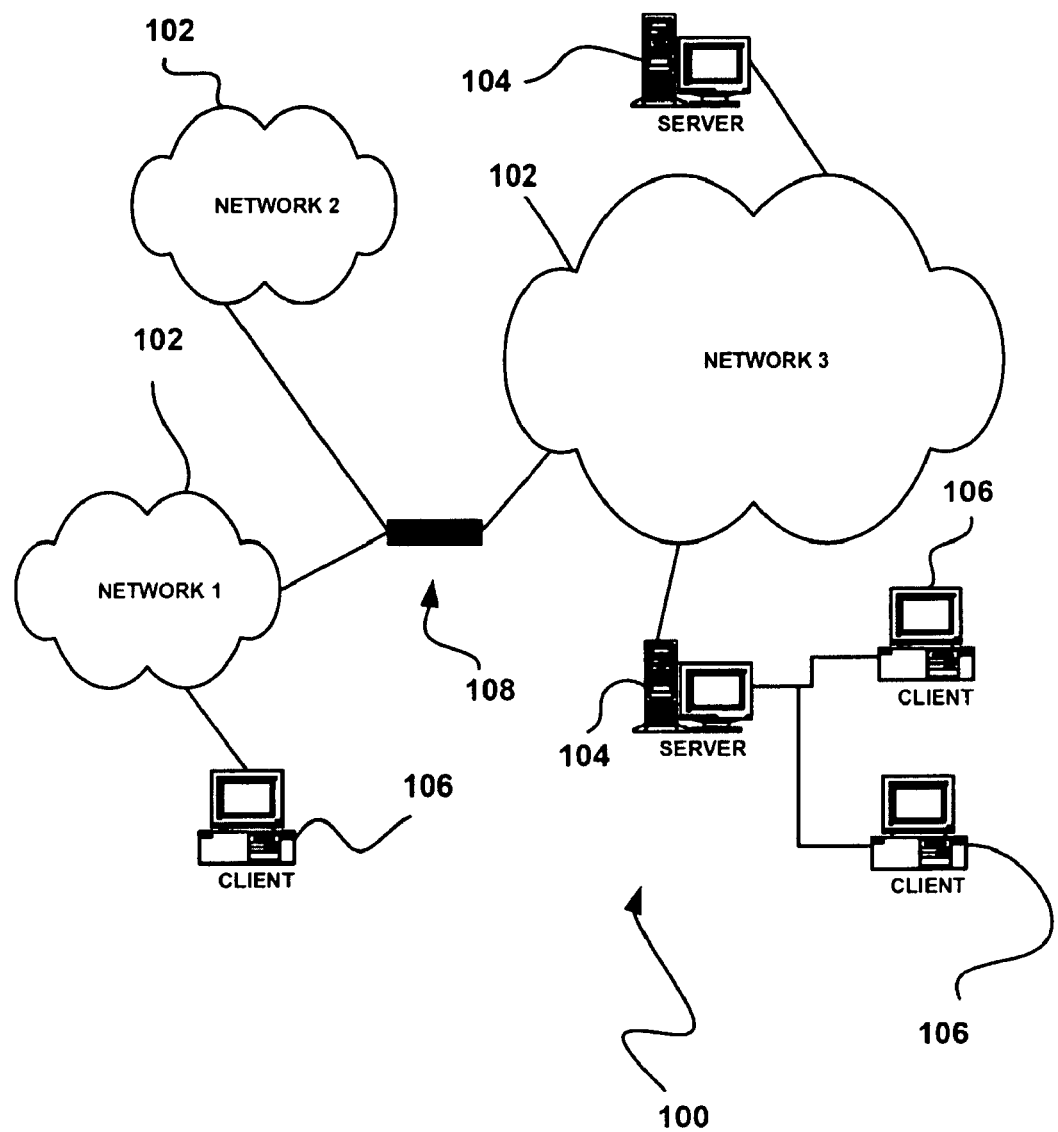
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
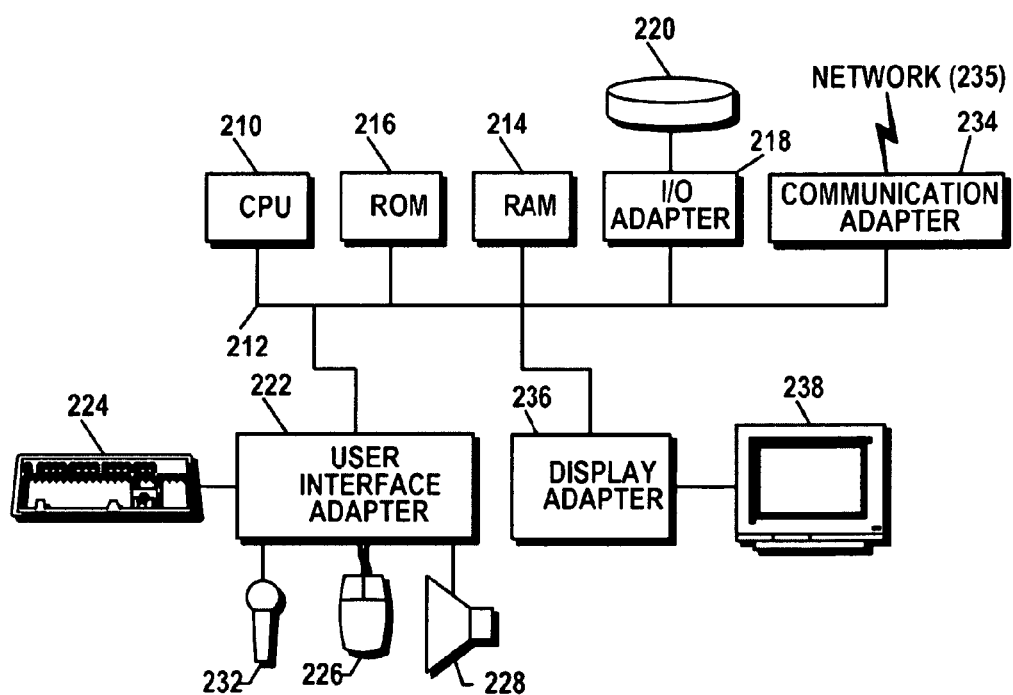
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
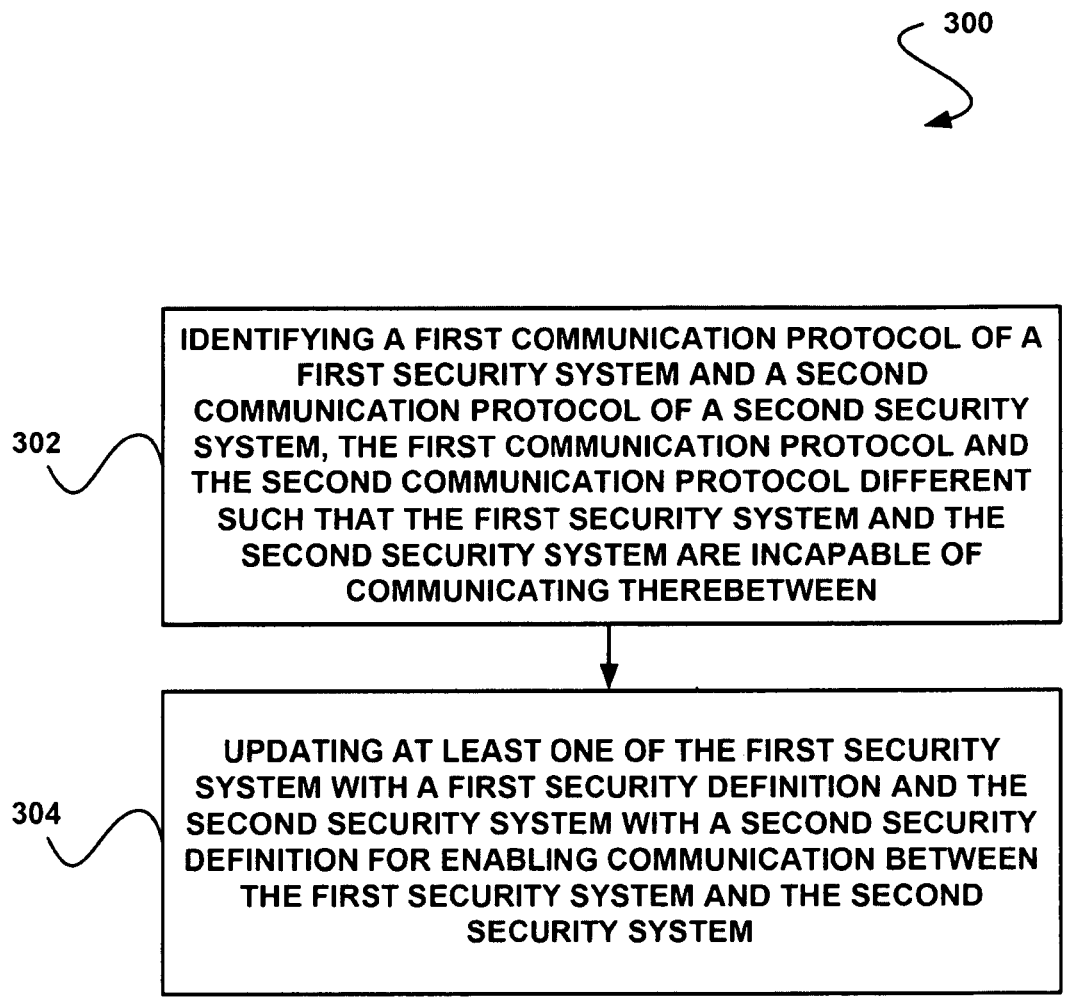
FIG. 3 shows a method for enabling communication between security systems, in accordance with one embodiment.

FIG. 3 shows a method 300 for enabling communication between security systems, in accordance with one embodiment. As an option, the method 300 may be carried out in the context of the architecture and environment of FIGS. 1 and/or 2. Of course, however, the method 300 may be carried out in any desired environment.

As shown in operation 302, a first communication protocol of a first security system and a second security protocol of a second security system are identified, where the first communication protocol and the second communication protocol are different such that first security system and the second security system are incapable of communicating therebetween. With respect to the present description, the first security system and the second security system may include any systems utilized for providing security which are incapable of communicating as a result of the different communication protocols utilized by such first security system and second security system. For example, the first security system and the second security system may each be utilized to secure any device on which such first security system and second security system are installed, another device that is remote to a device on which such first security system and second security system are installed, a network, etc.

In various embodiments, the first security system and/or the second security system may each include an anti-malware scanner (e.g. an on-demand anti-malware scanner), an access protection system (e.g. which utilizes access protection rules to protect against predetermined types of accesses, such as unwanted access to confidential data, etc.), a firewall, a behavioral security system (e.g. that detects unwanted activity utilizing heuristics), a clean boot system (e.g. that cleans a device of detected unwanted data during boot-up of the device), etc. As an option, the first security system and the second security system may include different types of security systems (e.g. the first security system may include an anti-malware scanner and the second security system may include an access protection system). As another option, the first security system and the second security system may include different versions of a same type of security system (e.g. each released by a different developer, each released at different times such that one of the security systems is newer than the other one of the security systems, etc.).

Additionally, the first communication protocol utilized by the first security system and the second communication protocol utilized by the second security system may include any types of protocols (e.g. rules, standards, etc., such as for data representation) utilized for communication purposes (e.g. communication over a network, communication within a single device, etc.) which are different such that the first security system and the second security system are incapable of communicating as a result. Just by way of example, the first communication protocol or the second communication protocol may include a domain name system (DNS) protocol. In one embodiment, the first communication protocol may be proprietary to the first security system and/or the second communication protocol may be proprietary to the second security system. Of course, however, the first communication protocol and the second communication protocol may be different in any desired manner that results in the first security system and the second security system being incapable of communicating therebetween.

In one exemplary embodiment, the first security system may only be operable after boot-up of a device on which it is installed (e.g. an anti-malware scanner and/or any other security system that executes within an operating system of the device), whereas the second security system may only be operable during boot-up of the device (e.g. a clean boot system). To this end, the second communication protocol of the second security system may be particularly adapted (e.g. only operable) for use during the boot-up of the device, and the first communication protocol of the first security system may optionally only be operable after the boot-up of the device is complete (e.g. after the operating system of the device is executed), such that the first security system and the second security system are prevented from communicating.

In another exemplary embodiment, the first security system may be installed on a first device and the second security system may be installed on a second device, where the first device and the second device are coupled via a network. The first communication protocol may be associated with the first device (e.g. an operating system of the first device) and the second communication protocol may be associated with the second device (e.g. an operating system of the second device), such that the first communication protocol and the second communication protocol prevent the first security system and the second security system from communicating.

Further, the first communication protocol and the second communication protocol may be identified by at least one server. In one embodiment, the first security system and the second security system may both be in communication with a single server (e.g. via a network), such that the single server may identify the communication protocols thereof. In another embodiment, the first security system and the second security system may each be in communication with a different server (e.g. via the same network, different networks, etc.), such that a first server in communication with the first security system may identify the first communication protocol and a second server in communication with the second security system may identify the second communication protocol. Of course, however, the first server and the second server may be in communication (e.g. via network, etc.) and may share information regarding the first communication protocol and the second communication protocol, such that the first server and/or the second server may identify the first communication protocol and the second communication protocol.

As an option, the first communication protocol and the second communication protocol may be identified in response to detection of the first security system and the second security system. For example, a search for any security system or a particular type of security system may be performed, and upon detection of the first security system and the second security system, the first communication protocol and the second communication protocol respectively associated therewith may be identified. As another example, the first communication protocol and the second communication protocol may be identified in response to the first security system detecting the second security system and/or the second security system detecting the first security system.

Optionally, the first security system and/or the second security system may automatically perform a search for another security system with which communication may be established (e.g. over a network, within a device, etc.), if such communication is capable of being enabled. As another option, the first security system and/or the second security system may perform such a search upon a detection of data or activity that is determined to be potentially unwanted (e.g. if it cannot be determined that the data or activity is necessarily unwanted or wanted), upon a detection of unwanted data or activity that is incapable of being cleaned by the security system that detected such unwanted data or activity, and/or upon any other event associated with one security system in which further action by another security system is desired.

As another option, a user may manually detect the first security system and the second security system and may submit a request (e.g. to a server, etc.) for communication to be established between the first security system and the second security system. In response to receipt of such request, the communication protocol of the first security system and the second security system may be automatically identified. For example, the communication protocol of the first security system and the second security system may be automatically identified for the reasons set forth below with respect to operation 304.

As also shown, the first security system is updated with a first security definition and/or the second security system is updated with a second security definition for enabling communication between the first security system and the second security system. Note operation 304. With respect to the present description, the first security definition and the second security definition may each include any type of update capable of being utilized to enable communication between the first security system and the second security system.

It should be noted that the first security definition and the second security definition may each define any desired parameters capable of being utilized for enabling communication between the first security system and the second security system. Further, the first security definition may be generated utilizing a format that matches other security definitions used by the first security system (e.g. for detecting unwanted data), such that the first security definition is readable by the first security system (and thus implementable by the first security system for updating the same). Similarly, the second security definition may be generated utilizing a format that matches other security definitions used by the second security system, such that the second security definition is readable by the second security system (and thus implementable by the second security system for updating the same).

For example, the first security definition and the second security definition may each define first logic to be used for producing a communication (e.g. to be sent to a security system), in addition to second logic to be used for consuming (e.g. reading, acting upon, implementing, etc.) a received communication. In various embodiments, the first security definition and the second security definition may each define a medium of communication, a structure for the communication, a response for the communication, etc.

In one embodiment, the medium of communication may include a type of communication (e.g. a communication channel, etc.) to be utilized between the first security system and the second security system. As an option, the medium of communication may define where and how data to be included in the communication is to be sent, along with the media to be used to send the data. For example, the medium of communication may indicate that communication is to be performed utilizing a file, a registry, a named pipe, memory, manual input, a network packet, an electronic mail (email) message, etc. In this way, the first security system and/or the second security system may be updated to enable communication in which a file is transmitted therebetween, a registry entry is modified by one of the security systems, memory associated with a device of one of the security systems is modified by the other security system, etc.

In another embodiment, the structure for the communication may include a type of data to be included in the communication, such as commands, instructions, requests, logged data, etc. In another embodiment, the structure for the communication may include a format of the communication (e.g. a format for the medium of communication). In yet another embodiment, the structure may include a meaning of the data to be included in the communication.

Still yet, the response for the communication may optionally indicate a type of response to be communicated as a result of receipt of a communication. In one embodiment, the type of response may include an acknowledgement of receipt. In another embodiment, the type of response may include a confirmation of an action taken (e.g. cleaning detected unwanted code, verifying potentially unwanted code as unwanted) based on the receipt of the communication. Just by way of example, as a result of one of the security systems receiving a communication from the other one of the security systems, the response may be sent from the security system that received the communication to the other security system that sent the communication. In yet another embodiment, the type of response may include deletion of data received via the communication (e.g. a file, etc.). Of course, however, the type of response may include no response to the communication, such that the first security definition and/or the second security definition may indicate that a response to receipt of a communication is not necessary, as an option.

In one embodiment, the first security system may be updated with the first security definition (e.g. via the communication protocol of the first security system). For example, only the first security system may be updated with the first security definition (e.g. thus preventing the updating of the second security system) if the first security definition enables the first security system to communicate utilizing the second communication protocol of the second security system. Optionally, only the first security system may be updated with the first security definition if the second security system is incapable of being updated, if the second security system already has a rich interface built-in, etc. Thus, the first security definition may optionally be utilized for updating the first security system to communicate via the second communication protocol already used by the second security system.

In another embodiment, the second security system may be updated with the second security definition (e.g. via the communication protocol of the second security system). For example, only the second security system may be updated with the second security definition (e.g. thus preventing the updating of the first security system) if the second security definition enables the second security system to communicate utilizing the first communication protocol of the first security system. Optionally, only the second security system may be updated with the second security definition if the first security system is incapable of being updated, if the first security system already has a rich interface built-in, etc. Thus, the second security definition may optionally be utilized for updating the second security system to communicate via the first communication protocol already used by the first security system.

In yet another embodiment, the first security system may be updated with the first security definition and the second security system may be updated with the second security definition. Just by way of example, the first security system may be updated with the first security definition and the second security system may be updated with the second security definition to enable the first security system and the second security system to communicate utilizing a third communication protocol different from the first communication protocol and the second communication protocol. To this end, the third communication protocol may optionally be new for (e.g. not previously utilized by) both the first security system and the second security system.

Of course, as another example, the first security system may be updated with the first security definition and the second security system may be updated with the second security definition, where the first security definition enables the first security system to communicate utilizing the second communication protocol and the second security definition enables the second security system to communicate utilizing the first communication protocol. Accordingly, the first security system and the second security system may each be updated to communicate using the other's communication protocol, so that the first security system and the second security system have a choice in using the first communication protocol and the second communication protocol for communication purposes.

As an option, if the first security system is updated with the first security definition and the second security system is updated with the second security definition, the update to the first security system may be synchronized with the update to the second security system. As another option, the aforementioned updates may be asynchronous.

Moreover, the first security system may optionally be updated with the first security definition by a first server and the second security system may optionally be updated with the second security definition by a second server. As described above, each of the first security system and the second security system may in communication with a different server, such that the update to the first security system and the update to the second security system may be provided by the corresponding server associated therewith. As another option, and as also noted above, the first security system and the second security system may be in communication with a single server, such that the update to the first security system and the update to the second security system may be provided by the single server. Of course, however, the first security system and the second security system may be updated in any manner that utilizes the first security definition and the second security definition, respectively.

To this end, the first security system is updated with a first security definition and/or the second security system is updated with the second security definition for enabling the first security system and the second security system to communicate therebetween (e.g. via a network, within a device, etc.). For example, the first security definition and/or the second security definition may enable the first security system and the second security system to directly communicate, without necessarily using any intermediate interfaces, applications, devices, etc.

Furthermore, the update to the first security system and/or the update to the second security system may be automatically performed based on the identification of the different communication protocols (i.e. the first communication protocol and the second communication protocol) utilized by the first security system and the second security system, without necessarily requiring manual intervention, a re-release of the first security system and/or the second security system, etc. As another option, the first security system and/or the second security system may be updated via the first security definition and the second security definition, respectively, for enabling communication between the first security system and the second security system, such that an upgrade to the code of the first security system and/or the second security system for enabling such communication may be prevented.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
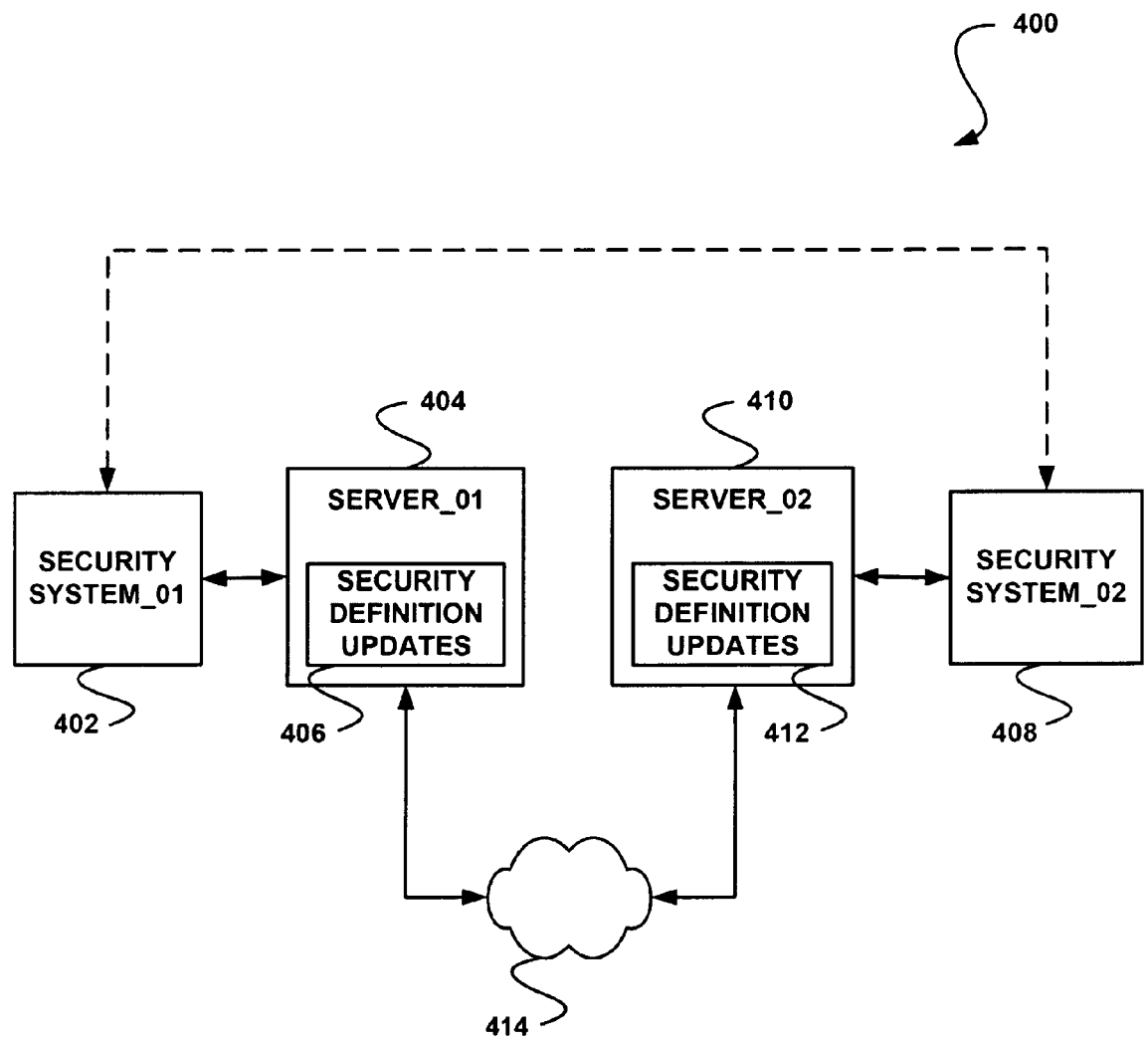
FIG. 4 shows a system for enabling communication between security systems, in accordance with another embodiment.

FIG. 4 shows a system 400 for enabling communication between security systems, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a first security system 402 is coupled with a first server 404. For example, the first security system 402 may be coupled with the first server 404 via a network. As an option, the first security system 402 may be installed on a first device (not shown) coupled to the first server 404. In one embodiment, the first server 404 may be associated with the first security system 402 for providing updates to signatures of known unwanted data stored with respect to the first security system 402, etc.

Additionally, a second security system 408 is coupled with a second server 410. In one embodiment, the second security system 408 may be coupled with the second server 410 via the same network coupling the first security system 402 and the first server 404. In another embodiment, the second security system 408 may be coupled with the second server 410 via a different network than that coupling the first security system 402 and the first server 404.

Optionally, the second security system 408 may be installed on a second device (not shown) coupled to the second server 410. Such second device may be connected to the first device via a network (not shown). As another option, the second security system 408 may be installed on the first device on which the first security system 402 is installed.

With respect to the present embodiment, the first security system 402 employs a first communication protocol. Also with respect to the present embodiment, the second security system 408 employs a second communication protocol. Further, the first communication protocol and the second communication protocol are different such that the first security system 402 and the second security system 408 are incapable of communicating therebetween.

In use, the first communication protocol and the second communication protocol may be identified by the first server 404 and/or the second server 410. For example, the first security system 402 may detect the second security system 408. As an option, the first security system 402 may detect the second security system 408 in response to a partial detection of unwanted data (e.g. detection of data as potentially unwanted) by the first security system 402.

In addition, based on such partial detection of unwanted data, the first security system 402 may send a request to the first server 404 to communicate with the second security system 408. For example, the first security system 402 may request to communicate with the second security system 408 for instructing the second security system 408 to verify whether the detected potentially unwanted data is unwanted. Moreover, the first server 404 may identify the first communication protocol of the first security system 402 (e.g. based on the request, via a look-up table, etc.). Also, the first server 404 may identify the second communication protocol of the second security system 408 (e.g. by requesting information from the second security system 408, by requesting an identification of the second communication protocol from the second server 410 via a network 414 coupled therebetween, etc.). It should be noted that the second server 410 may also similarly identify the first communication protocol and the second communication protocol.

As shown, the first server 404 stores a plurality of security definition updates 406 and the second server 410 also stores a plurality if security definition updates 412. The security definition updates 406 of the first server 404 may be the same or different from the security definition updates 412 of the second server 410. For example, the security definition updates 406 of the first server 404 may be particular to (e.g. adapted for use by) the first security system 402, whereas the security definition updates 412 of the second server 410 may be particular to the second security system 408.

To this end, the first security system 402 is updated by the first server 404 with a first security definition 406 and/or the second security system 408 is updated by the second server 410 with a second security definition 412. The first security definition 406 and the second security definition 412 are each adapted, alone or in combination based on the data included therein, for enabling communications between the first security system 402 and the second security system 408. As an option, to achieve bi-directional and multi-purpose communication between the first security system 402 and the second security system 408, the first security definition 406 and the second security definition 412 may optionally include several protocols defining data transmitted in both directions, and versioning of the communications may be defined in the protocol to support backward compatibility.

Figure 5:
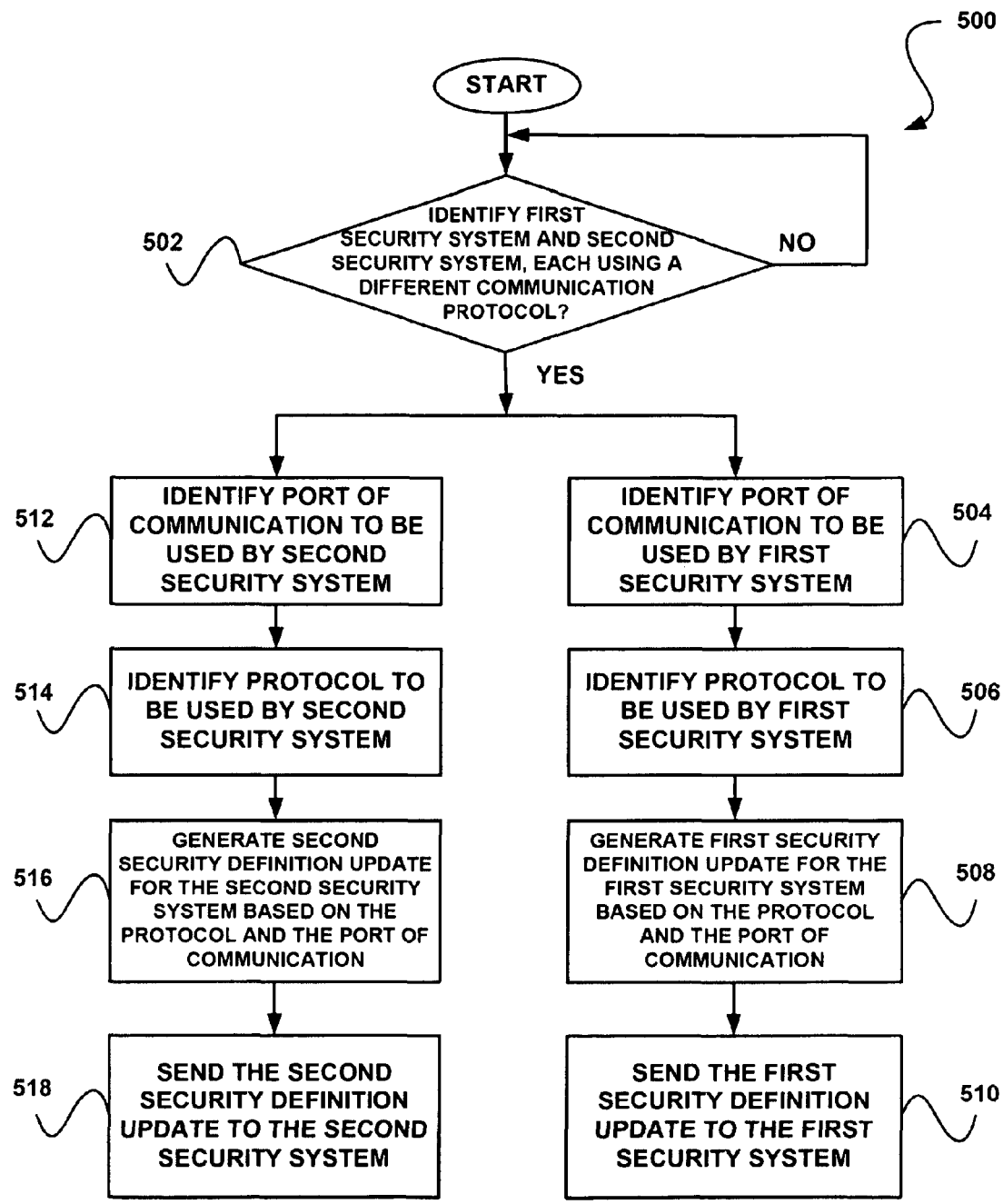
FIG. 5 shows a method for updating a first security system with a first security definition and a second security system with a second security definition for enabling communication therebetween, in accordance with yet another embodiment.

FIG. 5 shows a method 500 for updating a first security system with a first security definition and a second security system with a second security definition for enabling communication therebetween, in accordance with yet another embodiment. As an option, the method 500 may be carried out in the context of the architecture and environment of FIGS. 1-4. Of course, however, the method 500 may be carried out in any desired environment. Again, it should be noted that the aforementioned definitions may apply during the present description.

As shown in decision 502, it is determined whether a first security system and a second security system are identified, where the first security system and the second security system each use a different communication protocol such that communication therebetween is prevented. The determination may be made based on a comparison of an identifier of the communication protocol used by the first security system an identifier of the communication protocol used by the second security system. Of course, however, the determination may be made in any desired manner.

If it is determined that a first security system and a second security system using different communication protocols are not identified, the method 500 continues to wait for a first security system and a second security system using different communication protocols to be identified. If, however, it is determined that a first security system and a second security system using different communication protocols are identified, each of the first security system and the second security system are updated in parallel for enabling communication therebetween, as shown in operations 504-518.

In particular, in operation 504, a port of communication to be used by the first security system is identified. The port of communication may indicate where and how data is to be sent. In addition, the port of communication may indicate a media to be used to send the data. Optionally, the port of communication to be used by the first security system may be identified according to a communication protocol utilized by the second security system, such that the port of communication includes that which is employed by the communication protocol utilized by the second security system.

Similarly, in operation 512, a port of communication to be used by the second security system is identified. Optionally, the port of communication to be used by the second security system may be identified according to a communication protocol utilized by the first security system, such that the port of communication includes that which is employed by the communication protocol utilized by the first security system.

Thus, objects already utilized by the first security system for communication may be used as a port of communication by the second security system to transmit and receive communications. In addition, objects already utilized by the second security system for communication may be used as a port of communication by the first security system to transmit and receive communications. For example, an anti-malware scanner may routinely scan files, such that the port of communication to be used by another security system for communicating with the anti-malware scanner may include files (e.g. such that communications may be presented as a file). In other examples, the port of communication to be used by a security system for communicating with a firewall may include a network packet, the port of communication to be used by a security system for communicating with an anti-spam system may include an email, etc.

Additionally, a protocol to be used by the first security system is identified, as shown in operation 506. The protocol may indicate a data format to be used in sending data in addition to a meaning of the data to be sent. The protocol may optionally be identified according to a communication protocol utilized by the second security system, such that the protocol includes that which is employed by the communication protocol utilized by the second security system.

Similarly, in operation 514, a protocol to be used by the second security system is identified. The protocol may optionally be identified according to a communication protocol utilized by the first security system, such that the protocol includes that which is employed by the communication protocol utilized by the first security system.

Furthermore, a first security definition update is created for the first security system based on the protocol and the port of communication to be used by the first security system (note operation 508), and a second security definition is created for a second security system based on the protocol and the port of communication to be used by the second security system (note operation 516). Each security definition update may be used to create logic in the security system to which it will be applied for populating a media of the security system (e.g. native to its operation) with data to be sent to the other security system. In addition, each security definition update may be used to create logic in the security system to which it will be applied for receiving data from the other security system and correctly interpreting such data.

Optionally, both security definition updates may include matching sending and receiving routines for establishing communication between the first security system and the second security system. As another option, the security definition updates may be programmatically complex allowing them to enable non-trivial inter-product communication, or may be simple for enabling trivial communication.

Still yet, the first security definition update is sent to the first security system (operation 510) and the second security definition update is sent to the second security system (operation 518) for enabling communication between the first security system and the second security system. For example, with respect to the present embodiment, the first security system may be capable of communicating via the communication protocol of the second security system and the second security system may be capable of communicating via the communication protocol of the first security system.

Various examples are presented below for describing the manner in which two security systems enabled to communicate with each other via security system updates, as described above, may utilize such communication to detect, remove, etc. unwanted data. It should be noted that such descriptions are set forth for illustrative purposes only, and thus should not be construed as limiting in any manner.

Thus, in one exemplary embodiment, a new rootkit may be running on a device, and a clean boot security system of the device may be incapable of detecting the rootkit (e.g. due to limitations in the clean boot security system at the time it was released or even due to the clean boot security system not being up-to-date). In addition, a behavioral security system running on the device may detect the rootkit generically, but may be incapable of cleaning (e.g. removing) the rootkit from the device when the rootkit is active. The clean boot security system could clean the device of the rootkit, but the clean boot security system does not have information about the detection of the rootkit. Accordingly, to clean the rootkit, the behavioral security system creates a special file (messaging file) which contains the location of the rootkit, a name of the rootkit, and a sequence of steps to clean this rootkit at system startup. At startup time, the clean boot security system identifies the messaging file and interprets its contents to perform proper cleaning (e.g. utilizing the sequence of steps indicated in the file). In addition, the clean boot security system may optionally send a signal back to the behavioral security system (e.g. via a file) indicating a result of the cleaning (e.g. that the device has been cleaned of the rootkit).

In another exemplary embodiment, a communication protocol of two security systems which is enabled via a security definition update to at least one of the security systems may include a medium of communication that is a file. One of the security systems may create a file including a list of instructions for repairing unwanted data (e.g. removing the unwanted data) detected by such security system. The file may then be communicated to the other security system such that the other security system may execute the instructions. Once the other security system executes the instructions in the file, such other security system may delete the file. Deletion of the file may be a response required by the communication protocol utilized by the two security systems for communicating therebetween.

In yet another exemplary embodiment, an anti-malware scanner may detect behavior relates to a virus, but may be incapable of identifying the virus due to the virus employing techniques to hide itself from the anti-malware scanner. Thus, the anti-malware scanner may write to a file a description of the anti-malware scanner's knowledge (e.g. learned data) regarding the virus and instructions to clean the virus from the device on which it is located. In one embodiment, the anti-malware scanner may instruct a user to reboot the device and initiate a clean boot system of the device. In another embodiment, the anti-malware scanner may trigger the rebooting of the device and the initiating of the clean boot system.

Accordingly, the clean-boot program may be booted, may read the file from the anti-malware scanner, and may clean the device of the virus using the description and instructions in the file. The clean-boot program may perform the aforementioned tasks even if the clean-boot program is incapable of detecting the virus in the first place (namely since the anti-malware scanner identified the virus). In this way, the anti-malware scanner and the clean boot system may complement each other for detecting and cleaning unwanted data.

In yet another exemplary embodiment, an anti-malware scanner may detect malware, but may be incapable of removing the malware from the system on which it is located because it operates at a high level (e.g. user mode) whereas the malware may operate at a lower level (e.g. kernel mode). The anti-malware scanner may search for another security system capable of removing the detected malware. Based on the search, the anti-malware scanner may identify a host intrusion prevention system (HIPS) capable of implementing low level hooks for removing malware. The anti-malware scanner may pass information to the HIPS via memory, and the HIPS may use such information and low level hooks to remove the malware from memory.

In another exemplary embodiment, a behavioral security system may examine events that occur on a device and may create a history of such events. Additionally, an anti-malware scanner may detect unwanted data during scanning of the device. The anti-malware scanner may notify the behavioral product of the unwanted data, and the behavioral security system may accordingly utilize the history of events for identifying other data associated with the unwanted data and for cleaning the unwanted data and the identified other data associated therewith.

In yet another exemplary embodiment, a first security system may be updated with a first security definition for creating scripts capable of being supplied to and utilized by a second security system. For example, the first security system may be updated to create the scripts utilizing standard scripting, Visual Basic® Scripting (VBS), JavaScript™, etc. After such update, the first security system may supply a general purpose script to the second security system. The second security system may execute the script in its own context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for identifying a first communication protocol of a first security system and a second communication protocol of a second security system, the first communication protocol and the second communication protocol different such that the first security system and the second security system are incapable of communicating therebetween; and
   computer code for updating at least one of the first security system with a first security definition and the second security system with a second security definition for enabling communication between the first security system and the second security system, wherein the first security system is only operative after boot-up of a device and the second security system is only operable during boot-up of the device.

2. The computer program product of claim 1, wherein the first security system includes an on-demand anti-malware scanner and the second security system includes an access protection system.

3. The computer program product of claim 1, wherein the computer program product is operable such that the first communication protocol and the second communication protocol are identified by at least one server.

4. The computer program product of claim 1, wherein the computer program product is operable such that the first communication protocol and the second communication protocol are identified in response to at least one of the first security system detecting the second security system and the second security system detecting the first security system.

5. The computer program product of claim 1, further comprising computer code for updating the first security system with the first security definition.

6. The computer program product of claim 1, wherein only the first security system is updated with the first security definition if the first security definition enables the first security system to communicate utilizing the second communication protocol.

7. The computer program product of claim 1, further comprising computer code for updating the first security system with the first security definition and the second security system with the second security definition.

8. The computer program product of claim 7, wherein the computer program product is operable such that the update to the first security system is synchronized with the update to the second security system.

9. The computer program product of claim 7, wherein the first security system is updated with the first security definition by a first server and the second security system is updated with the second security definition by a second server.

10. The computer program product of claim 1, wherein the first security system is updated with the first security definition and the second security system is updated with the second security definition to enable the first security system and the second security system to communicate utilizing a third communication protocol different from the first communication protocol and the second communication protocol.

11. The computer program product of claim 1, wherein the first security definition and the second security definition each define a medium of communication, a structure for the communication, and a response for the communication.

12. The computer program product of claim 11, wherein the medium of communication includes at least one of a file, a registry, a named pipe, memory, and manual input.

13. The computer program product of claim 11, wherein the structure for the communication includes a type of data to be included in the communication and a format of the data.

14. The computer program product of claim 11, wherein the response for the communication indicates that no response to the communication is necessary.

15. A method, comprising:
   identifying, by a computer, a first communication protocol of a first security system and a second communication protocol of a second security system, the first communication protocol and the second communication protocol different such that the first security system and the second security system are incapable of communicating therebetween; and
   updating at least one of the first security system with a first security definition and the second security system with a second security definition for enabling communication between the first security system and the second security system, wherein the first security system is only operative after boot-up of a device and the second security system is only operable during boot-up of the device.

16. A system including a processor coupled to memory via a bus, comprising:
   a first security sub-system with a first communication protocol;
   a second security sub-system with a second communication protocol, the second communication protocol different from the first communication protocol such that the first security sub-system and the second security sub-system are incapable of communicating therebetween;
   wherein the system is operable to update at least one of the first security sub-system with a first security definition and the second security sub-system with a second security definition for enabling communication between the first sub-system system and the second security sub-system, wherein the first security sub-system is only operative after boot-up of a device and the second security sub-system is only operable during boot-up of the device.

* * * * *